March 28, 1967 A. WALKER 3,311,864
THERMOCOUPLE PICKUP
Original Filed Oct. 29, 1962 3 Sheets-Sheet 1
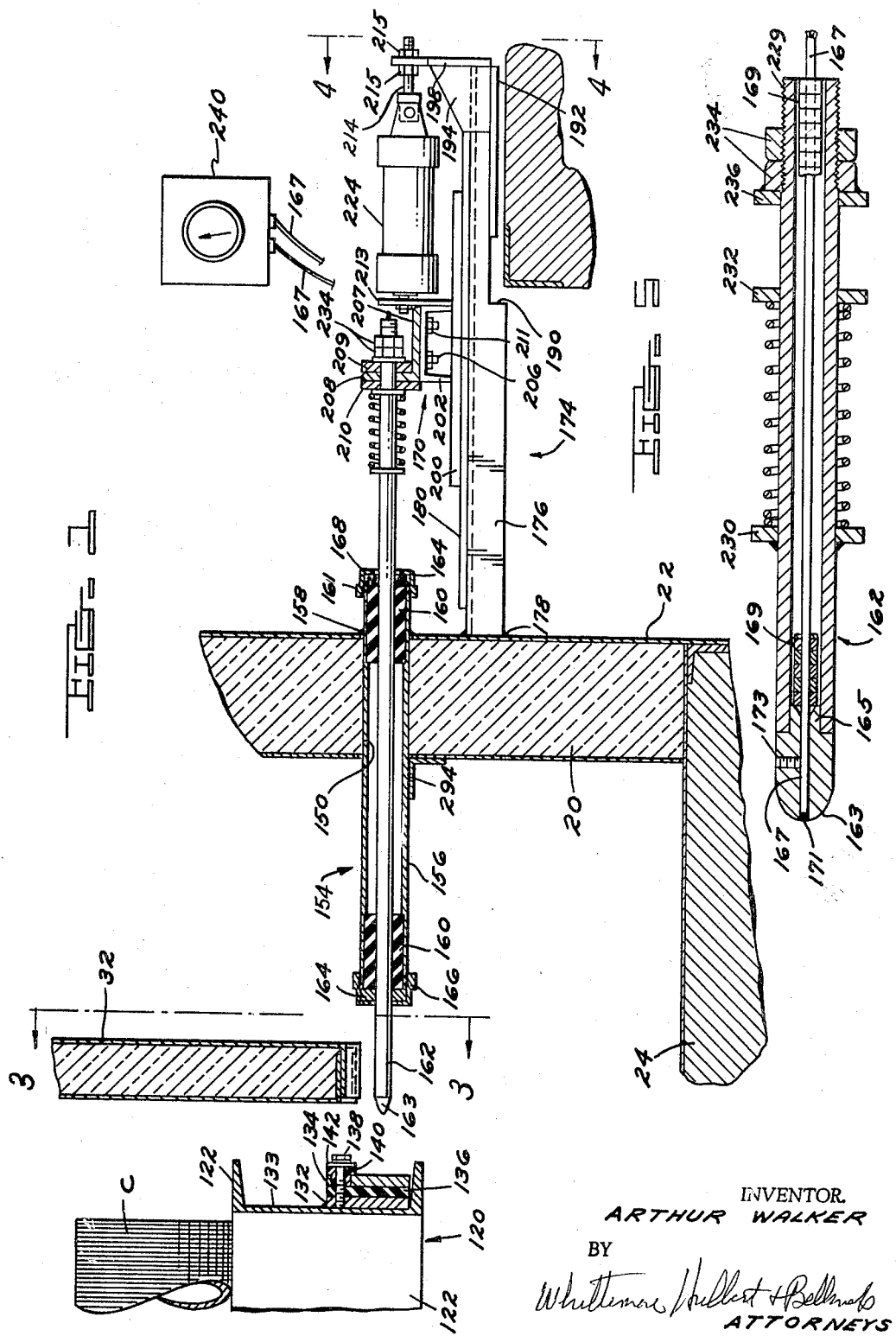
INVENTOR.
ARTHUR WALKER
BY
Whittemore, Hulbert & Belknap
ATTORNEYS

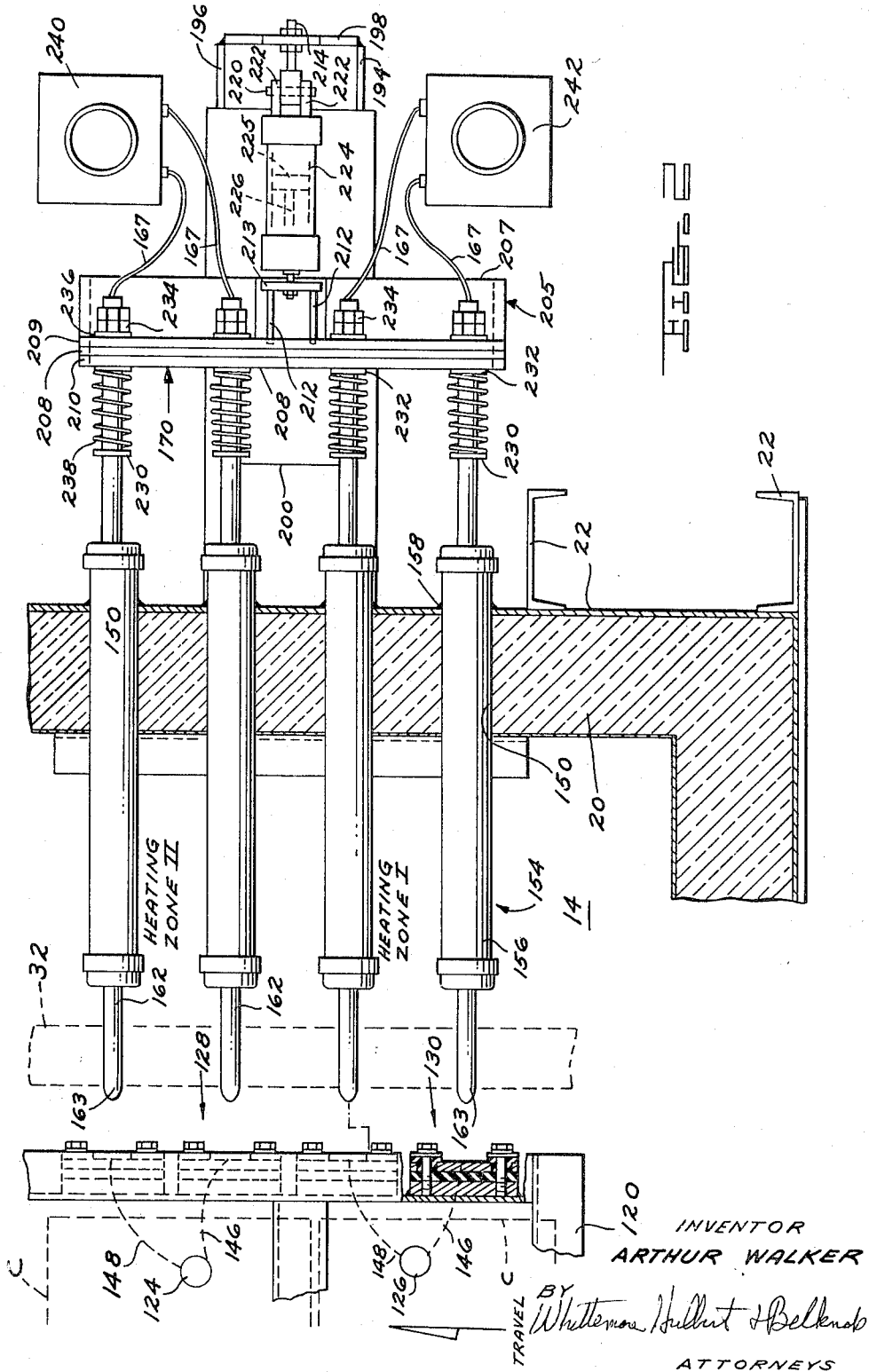

March 28, 1967 A. WALKER 3,311,864
THERMOCOUPLE PICKUP
Original Filed Oct. 29, 1962 3 Sheets-Sheet 3
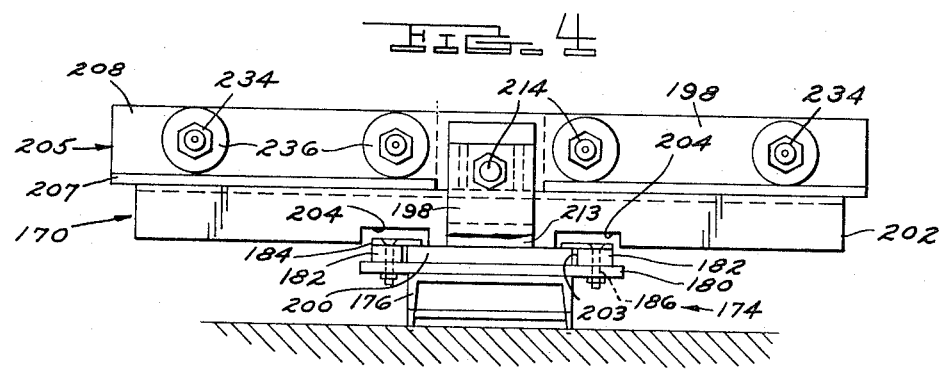
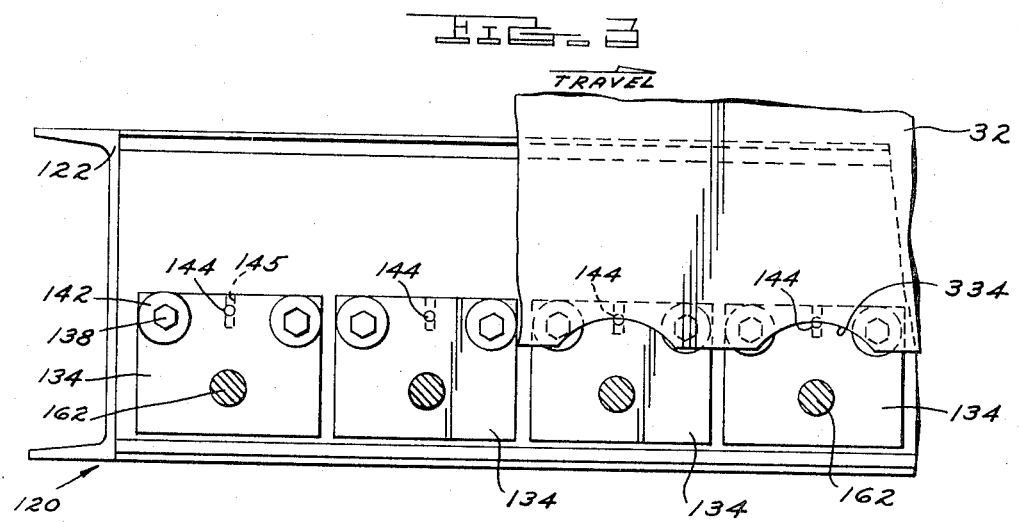
INVENTOR
ARTHUR WALKER
BY
Whittemore Hulbert + Belknap
ATTORNEYS United States Patent Office 3,311,864
Patented Mar. 28, 1967

3,311,864
THERMOCOUPLE PICKUP
Arthur Walker, Greenbrier, Ark., assignor to Holcroft & Company, Detroit, Mich., a corporation of Michigan
Original application Oct. 29, 1962, Ser. No. 233,545, now Patent No. 3,259,381, dated July 5, 1966. Divided and this application Oct. 19, 1965, Ser. No. 497,756
4 Claims. (Cl. 339—108)

This application is a division of Ser. No. 233,545 filed October 29, 1962, now Letters Patent No. 3,259,381 of July 5, 1966. The invention in this divisional application relates to an electrical probe device and to an electrical connector structure.

This invention relates to a heat processing unit of the indirect type utilizing a controlled inert protective gas atmosphere and relates more particularly to a thermoelectric pyrometer for a radiant tube fired annealing furnace which is particularly adaptable for treating materials such as aluminum coils.

This invention is characterized by the provision of a heat processing unit having one or more sealed chambers through which a car or carrier is moved. A thermocouple is located in or on the material on the carrier, as an example, aluminum coils, and is electrically connected to a pair of contact points provided on the carrier. A pair of movable contact probes electrically connected to an instrument located exteriorly of the processing unit are adapted to be moved through a wall of the processing unit into contact with the contact points provided on the carrier to complete an electrical circuit between the thermocouple and the instrument. The instrument is designed to utilize the output of the thermocouple as a signal for temperature indication or control.

It is an object of the present invention to provide a heat processing unit utilizing a controlled inert protective gas atmosphere wherein means are provided for making an electrical connection between one or more thermocouples located in or on material or materials which are located on a movable car, carrier, or platform in a sealed chamber, and any instrument which is adapted to convert the output of the thermocouple into a signal which is required for temperature indication or control, said instrument being located outside of the sealed chamber.

A further object of the present invention is to provide a heat processing unit of the aforementioned type wherein the instrument includes means for calibrating the output of the thermocouple in terms of the temperature of the material.

Still another object of the present invention is to provide a heat processing unit of the aforementioned type wherein the means for moving the contact probes includes an arm operatively connected to the ends of the contact probes located exteriorly of the furnace, said arm being adapted to move the contact probes in unison toward and away from the contact points to respectively make and break the aforesaid electrical circuit.

A further object of the present invention is to provide a heat processing unit of the aforementioned type wherein operated means is operatively connected to the arm for moving the arm and contact probes.

Specifically, the unit of the invention includes a contact probe assembly having an elongated tubular casing, an elongated tubular bar disposed within that casing in electrically insulated and radially spaced release to the wall of the latter. The bar has an electrically conductive contact piece of solid cross section mounted at an end thereof, at which the probe engages a thermocouple; and the probe assembly is further provided with an electrical conductor in conducting engagement with the contact piece, and brought out of the opposite end of the tubular bar for electrical connection to an instrument.

It is another and general object of this invention to provide a simplified low cost structure of the aforementioned type having certain advantages contributing to efficiency, reliability, and long life, as well as ease of maintenance.

Further objects and advantages of the present invention will be apparent from the following description, reference being had to the accompanying drawings wherein a preferred form of the present invention is clearly shown.

FIGURE 1 is a vertical sectional view taken in a vertical plane at 90° through a sidewall of a furnace, as well as through the axis of tubular casing, tubular bar, and contact piece components of the heat processing unit of the invention.

FIGURE 2 is a partial view of the heat processing unit and illustrating in particular the thermoelectric pyrometer.

FIGURE 3 is a view taken on line 3—3 of FIGURE 1.

FIGURE 4 is an end view looking in the direction of arrows 4—4 of FIGURE 1.

FIGURE 5 is a longitudinal sectional view through one of the contact bars.

The present invention is particularly adapted for an annealing furnace or heat processing unit of the type illustrated and described in my Letters Patent No. 3,182,981 of May 11, 1965.

The present invention specifically relates to the electrical apparatus which is adapted to provide temperature indication and control without the necessity of having relatively long lead wires which are moved through the unit as the carrier is moved through the various chambers of the heat processing unit.

The carrier 120 is made from structural steel channels 122 and is appropriately mounted for lengthwise movement through the chambers 14 of the furnace 10. The aluminum coils C are appropriately stacked on the top surface of the carrier 120. Thermocouples 124 and 126 are embedded in the coils C as best illustrated in FIGURE 2.

As shown in FIGS. 1 and 2 of the drawings, the reference numeral 20 designates a side wall of the furnace, which is braced by the usual structural steel frame 22.

The channel 122 opposite one of a pair of radiation baffles 32 in chamber 14 is provided with two pairs of thermocouple pickups or contact point assemblies 128 and 130, each pair corresponding to one of the thermocouples. With such an arrangement the temperatures of the coils C corresponding to certain zones of one of the chambers, as an example the heating chamber 14 as illustrated, may be readily determined. It should be understood, however, that only one pair of contact point assemblies is required in certain applications.

The construction of each of the contact point assemblies is identical and therefore a description of one will suffice. Each contact point assembly includes a backup plate 132 made from a suitable metal such as steel. The plate 132 is welded to the web 133 of the channel 122 as illustrated in FIGURE 1. A second plate 134 made from a suitable alloy, as an example a chromium-nickel alloy (type 304), is spaced from the plate 132 by an insulating board 136 which may be made from transite. The plates 132, 134, and board 136 are all rectangular and are held in an assembled position by means of air pair of threaded fasteners 138. The fasteners 138 extend through hollow insulating plugs 140 which are provided in openings in the plate 134. The plugs 140 may also be made from transite. Washers 142 are provided between the faces of the plugs 140 and the heads of the threaded fasteners 138. The fasteners 138 extend through the plugs 140 and through openings in the board 136 into threaded openings in the backup plate 132 to retain the plates in an assembled relationship. A single contact such as a conventional Allen set screw 144 is threadedly received in an opening provided in the plate 134. An opening 145 is drilled in the upper edge of the plate 134 for receiving an end of a lead wire.

Lead wires 146 and 148 connect the thermocouples 124 and 126 to the adjacent pairs of contact point assemblies 128 and 130 as illustrated in FIGURE 2. The ends of the lead wires 146 and 148 are received in the openings 145 after which time the set screws 144 are adjusted to contact and retain the lead wires. Prior to assembly the transite board 136 is painted with a silicone resin.

A side wall 20 of the heating chamber 14 is provided with four transversely extending openings 150. The openings 150 are located opposite from the contact point assemblies 128 and 130 as best illustrated in FIGURE 2. Each contact point assembly has an associated contact probe assembly 154 which extends through one of the openings 150.

Each contact probe assembly 154 includes a tubular element, casing or guide 156 which extends through its corresponding opening 150 and terminates inwardly a predetermined distance from the radiation baffle 32 as best illustrated in FIGURE 1. The guide 156 also includes a portion which extends outwardly from the chamber 14 beyond the furnace. An intermediate portion of the guide 156 is welded to the steel plate 22 as indicated by the numeral 158 to provide a gas tight seal connection. A pair of insulators 160 are provided at the opposite ends of the guide 156. The insulators 160 are tubular in form and are made from ceramic material. An elongated, hollow contact bar, part, or piece 162 extends through the guide 156 and insulators 160. The contact bar 162 is spaced from the inner surface of the guide 156 by the insulators 160. The contact bar 162 is adapted to move lengthwise with respect to the fixed tubular element or guide 154 as will be subsequently described.

A plug 164 made from transite is provided at the inner end of the guide 156 against the outer face of the corresponding insulator 160. The plug 164 is held against the insulator 160 by means of a cap 166 which is threaded to the guide 156. Asbestos rope 168 is wrapped around the contact bar 162 and held against the outer face of the other insulator 160 by means of an end cap 161 which is threaded to the outer end of the guide 156.

The caps 164 are provided with openings to permit lengthwise movement or reciprocation of the contact bar 162. The hollow contact bar 162, as best illustrated in FIGURE 7, is made from, as an example, a chromium-nickel alloy. The leading end of the hollow contact bar 162 is provided with a tip 163 of solid cross section (FIG. 7) and the same material as the bar 162. The tip 163 has a reduced portion 165 which is received in the interior of the bar 162 and secured thereto. A thermocouple wire 167 is received within the hollow bar 162 and is surrounded throughout most of its length by a row of single hole insulators 169. The leading end of the wire 167 extends through the tip 163 and terminates at a contact plug weld 171 which is carried by the tip 163. For each pair of contact bars, one of the wires 167, as an example, is made from chromel, while the other wire 167 is made from alumel [(—) magnetic]. The wire 167 is held in the contact bar 162 by means of a set screw 173. As an example, the contact bar 162 is made from 1" O.D. x ¼" tubing and has a length of approximately 3' 4½".

Means are provided for moving the four contact probe assemblies 154 in unison toward and away from the electrical contact point assemblies 128 and 130 to respectively make and break the electrical circuits. The movable means includes a crosshead 170 which is appropriately connected to the outer ends of the four contact bars 162.

A stationary guide 174 is provided for the crosshead 170 and includes an inverted channel-shaped support 176 which has one end welded to the steel sheet 22 of the furnace wall as indicated by the numeral 178 in FIGURE 1. A plate 180 having a width greater than the width of the support 176 is mounted on top of the web of the channel-shaped support 176 and appropriately fastened thereto. The longitudinal edges of the plate 180 are provided with elongated transversely spaced guide bars 182 which are located on top of the plate 180 and extend lengthwise thereof. Retaining plates 184 are provided on top of the guide bars 182. The retaining plates 184 and guide bars 182 are secured to the plate 180 by means of longitudinally spaced threaded fasteners 186 as best illustrated in FIGURE 4.

The flanges of the support 176 at the outer end thereof is notched as indicated by the numeral 190 in FIGURE 1. A plate 192 is secured to the bottom edges of the support 176. The plate 192 is provided with side plates 194 and 196 which are connected by an end plate 198.

The movable crosshead 170 includes a base 200 which has secured thereto on the top side thereof a transversely extending channel-shaped support 202. The base 200 is adapted to move through the guide channel 203 defined by the guide rails 182. The base 200 is retained in the guide channel 203 by means of the retaining plates 184 as best illustrated in FIGURE 4. The flanges of the channel-shaped support 202 are notched, as indicated by the numeral 204, so as to avoid any interference with the retaining plates 184 during movement of the crosshead 170.

An elongated holding bracket 205, made from a 4" x 3" x ⅜ angle section is provided with four sets of threaded mounting studs 206 in the horizontal flange 207 of the bracket 205. The vertical flange 208 is provided with an elongated inner transite strip 209 and an outer transite strip 210. The strips 209 and 210 are appropriately secured to the vertical flange 208 by fastening means, not illustrated. The holding bracket 205 is mounted on the channel-shaped support 202 in such a manner that the four sets of studs 206 provided on the bracket 205 extend through corresponding openings provided in the support 202 and are locked in position by threaded lock nuts 211 as best illustrated in FIGURE 1.

The support 202 is provided with a pair of side plates 212 and an end plate 213, all of which are appropriately secured to the support 202. A threaded cylinder rod 214 is secured to the end plate 198 by nuts 215. The other end of the rod 214 is provided with a transversely extending pin 220 which is adapted to be received in lugs 222 carried by the cylinder 224. Mounted in the cylinder 224 is a fluid operated piston and rod assembly 225. The rod 226 of the assembly 225 is connected to the end plate 213 by a nut or the like such that upon application of fluid to the right-hand side of the piston as viewed in FIGURE 2, the crosshead 170 is actuated to, in turn, move the contact bars 162 to the left against the contact points 144 to close the electrical circuits.

The outer end of each contact bar 162 is threaded as indicated by the numeral 229 in FIGURE 5. A fixed washer 230 and a movable washer 232 are sleeved on the outer periphery of the contact bar 162. The washer 230 is welded to the contact bar 162. The vertical flange 208 is provided with four openings, one corresponding to each of the contact bars 162. The threaded ends 229 of the contact bars 162 extend through the openings and are each secured to the flange 208 by means of a pair of threaded lock nuts 234. A washer 236 is located around each contact bar 162 and is secured to the first lock nut 234, as an example, by welding. The washers 236 are in surface-to-surface contact with the inner transite strip 209, while washers 32 are held in surface-to-surface contact with the outer transite strip 210 by means of biasing springs 238. One biasing spring 238 is provided around each contact bar 162 in between the corresponding fixed washer 230 and the movable washer 232. One pair of adjacent lead wires 167 are connected to instruments 240, while the other pair of adjacent lead wires are connected to instrument 242.

The cylinder or fluid motor 224 is operated pneumatically, the operation of which is controlled by a solenoid as will be subsequently explained. The instruments 240 and 242, which are located outside of the furnace, are commercially available and are so calibrated to convert the E.M.F. generated by the thermocouples into a signal required for temperature indication or control.

Generally, with a heat processing unit having a plurality of chambers, a pair of independently operated contact probe assemblies are associated with each chamber. While in the present invention two pairs of contact assemblies have been shown with different zones in one chamber, it should be understood that in some applications only one pair of contact probe assemblies are utilized in each chamber.

The particular wiring of the subject unit to electrical furnace control and like circuitry constitutes no part of the present invention, but it is fully disclosed in my Patent No. 3,259,381 identified above.

What I claim as my invention is:

1. A contact probe assembly comprising an elongated tubular casing, an elongated, tubular bar disposed within said casing and projecting from at least one end of the latter, said bar being mounted for relative lengthwise movement in said casing and being supported for said movement in electrically insulated, radially spaced relation to the wall of said casing, said tubular bar being provided at a projecting end thereof with an electrically conductive contact piece of solid cross section mounted in fixed, coaxial relation to the bar, and an electrical conductor fixedly secured to said contact piece in electrically conducting engagement with the latter, said conductor extending through said tubular bar in radially spaced relation to the wall of the latter, said conductor extending through the opposite end of said bar and the corresponding end of said casing for electrical connection to an instrument or the like.

2. The contact probe assembly of claim 1, in which said tubular bar is of greater length than said casing and projects from both ends of the latter.

3. The contact probe assembly of claim 1, in which said solid section contact piece is fabricated of a chromium-nickel alloy.

4. The contact probe assembly of claim 2, in which said solid section contact piece is fabricated of a chromium-nickel alloy.

References Cited by the Examiner

UNITED STATES PATENTS

| | | | |
|---|---|---|---|
| 2,020,402 | 11/1935 | Edwards et al. | 339—108 X |
| 2,677,117 | 4/1954 | Swain | 339—108 X |
| 2,954,521 | 9/1960 | McKee | 339—108 X |
| 2,997,687 | 8/1961 | Walter | 339—176 X |
| 3,022,362 | 2/1962 | O'Brien | 339—176 X |

BOBBY R. GAY, *Primary Examiner.*

W. DONALD MILLER, EDWARD C. ALLEN,
*Examiners.*